US009990569B2

(12) United States Patent
Zhang et al.

(10) Patent No.: US 9,990,569 B2
(45) Date of Patent: Jun. 5, 2018

(54) IMAGE SCANNING DEVICE AND CONTROL METHOD THEREOF

(71) Applicant: WEIHAI HUALING OPTO-ELECTRONICS CO., LTD., Shandong (CN)

(72) Inventors: Wenbo Zhang, Shandong (CN); Zhanyue Ju, Shandong (CN); Yonghui Lin, Shandong (CN)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 144 days.

(21) Appl. No.: 14/899,853

(22) PCT Filed: Oct. 29, 2013

(86) PCT No.: PCT/CN2013/086164
§ 371 (c)(1),
(2) Date: Dec. 18, 2015

(87) PCT Pub. No.: WO2014/201793
PCT Pub. Date: Dec. 24, 2012

(65) Prior Publication Data

US 2016/0155028 A1 Jun. 2, 2016

(30) Foreign Application Priority Data

Jun. 20, 2013 (CN) .......................... 2013 1 0247074

(51) Int. Cl.

| | |
|---|---|
| ***G06Q 40/00*** | (2012.01) |
| ***G06K 9/78*** | (2006.01) |
| ***H04N 1/04*** | (2006.01) |
| ***H04N 1/00*** | (2006.01) |
| ***H04N 5/225*** | (2006.01) |
| ***H04N 5/235*** | (2006.01) |

(52) U.S. Cl.
CPC ........... *G06K 9/78* (2013.01); *H04N 1/00843* (2013.01); *H04N 1/04* (2013.01); *H04N 5/2256* (2013.01); *H04N 5/2354* (2013.01)

(58) Field of Classification Search
CPC .... G07D 7/1205; G07D 7/12; G07D 11/0084; G07D 7/00; G01N 2021/157; G01N 21/86; G01N 21/8806; G06K 9/74; G06K 9/78

(Continued)

(56) References Cited

U.S. PATENT DOCUMENTS 5,692,068 A * 11/1997 Bryenton ............... G07D 7/121 382/135
7,248,730 B2 * 7/2007 Matsui .................. G07D 7/128 250/200

(Continued)

FOREIGN PATENT DOCUMENTS

| | | |
|---|---|---|
| CN | 1042862 | 6/1990 |
| CN | 1101142 | 4/1995 |

(Continued)

OTHER PUBLICATIONS

International Search Report for PCT International Application No. PCT/CN2013/086164 dated Mar. 27, 2014.

*Primary Examiner* — Thien M Le
(74) *Attorney, Agent, or Firm* — Pearl Cohen Zedek Latzer Baratz LLP

(57) ABSTRACT

The disclosure discloses an image scanning device and a control method thereof, wherein the image scanning device includes: a bearing member, configured to receive a paper bill; a light source; a lens; a first converter, arranged on the emergent side of the lens and configured to convert light signals from the lens into electric signals; a controller, connected with the light source and the first converter, and configured to control the light emitting time of the light (Continued)

source, acquire the electric signals during the light emitting process of the light source, and acquire the electric signals again after the light source stops emitting light for a preset period of time. Through the disclosure, the problem of low accuracy of paper bill scanning in the prior technologies is solved, and the effect of increasing the accuracy of paper bill identification is achieved.

7 Claims, 6 Drawing Sheets

(58) Field of Classification Search
USPC .......................................................... 235/379
See application file for complete search history.

(56) References Cited

U.S. PATENT DOCUMENTS

2002/0092800 A1* 7/2002 Philipp .................. G07D 7/121 209/534
2003/0039359 A1* 2/2003 Thierauf .............. G07D 7/1205 380/54
2004/0218802 A1 11/2004 Suzuki
2004/0238619 A1 12/2004 Nagasaka et al.
2008/0133389 A1* 6/2008 Schowengerdt .......... G01J 3/02 705/34
2008/0135780 A1* 6/2008 Giering ................ G07D 7/1205 250/459.1
2011/0090485 A1* 4/2011 Cronin ............. H01L 27/14601 356/71
2013/0271753 A1* 10/2013 Schmalz ................ G01N 21/86 356/237.1

FOREIGN PATENT DOCUMENTS

| | | |
|---|---|---|
| CN | 1429379 | 7/2003 |
| CN | 200959137 | 10/2007 |
| CN | 102034131 | 4/2011 |
| CN | 201919074 | 8/2011 |
| CN | 102930631 | 2/2013 |
| CN | 102096959 | 6/2015 |
| GB | 2240947 | 8/1991 |
| JP | 2001357346 | 12/2001 |

* cited by examiner

IMAGE SCANNING DEVICE AND CONTROL METHOD THEREOF

CROSS-REFERENCE TO RELATED APPLICATIONS

This application is a National Phase Application of PCT International Application No. PCT/CN2013/086164, entitled "IMAGE SCANNING DEVICE AND CONTROL METHOD THEREOF", International Filing Date Oct. 29, 2013, published on Dec. 24, 2014 as International Publication No. WO/2014/201793, which in turn claims priority from Chinese Patent Application No. 201310247074.0, filed Jun. 20, 2013, all of which are incorporated herein by reference in their entirety.

TECHNICAL FIELD OF THE DISCLOSURE

The disclosure relates to the field of image processing, and more particularly to an image scanning device and a control method thereof.

BACKGROUND OF THE DISCLOSURE

In recent years, such automatic devices for processing paper currencies and bills or various marketable securities as currency count machines, currency detectors, and automatic teller machines etc. have been spread widely, and in these devices, there are scanning devices for identifying whether paper bills including paper currencies etc. are genuine or counterfeit.

These scanning devices identify whether paper bills are genuine or counterfeit through detecting reflected images or transmitted images, e.g. authenticity detection performed by means of scanning secondary light excited by an ultraviolet light source or an infrared light source etc. The secondary light refers to fluorescent light, phosphorescent light and infrared light etc. excited and generated by irradiation of irradiation light on printing ink and paper.

However, there are various anti-counterfeit technologies of paper bills in countries all over the world, and various kinds of printing ink on paper bills react differently to different lights. FIG. 1 is a sampling sequence diagram of an image scanning device in the prior technologies. As shown in FIG. 1, red light, green light and blue light are lit up in turn and sampled line by line during the sampling process. FIG. 2 is a sampling sequence diagram of a transmission scanning method in the prior technologies. The scanning principle of the transmission scanning method is that: light emitted by a transmission light source penetrates through an original copy (paper bill), which passes through a lens and is focused on a photosensitive sensor. FIG. 3 is a schematic diagram of brightness acquired according to the sampling sequence in FIG. 2. It is found by the inventor of the application that in the transmission scanning method, since there is transmission light source irradiating on the lens directly in an area without the original copy going through, output saturation will appear on the photosensitive sensor because of direct irradiation of the light source, thus generating an incidental image and reducing the scanning accuracy of paper bills. FIG. 4 is a schematic diagram of an incidental image generated by a photosensitive sensor due to output saturation. As shown in FIG. 4, a distortion zone S1 appears when an original copy is scanned and the ideal value of the gray scale of the distortion zone S1 should be 0. However, the actual gray scale of the distortion zone S1 is larger than 0 due to output saturation. FIG. 5 is a sampling sequence diagram of a reflection scanning method in the prior technologies. The scanning principle of the reflection scanning method is that: ultraviolet light emitted by a reflection light source irradiates on an original copy to excite secondary light which passes through a lens and is focused on a photosensitive sensor. FIG. 6 is a schematic diagram of brightness acquired according to the sampling sequence in FIG. 5. It is found by the inventor of the application that: in the reflection scanning method, phosphorescence may be generated on some paper bills irradiated by a ultraviolet light source and such phosphorescence will disappear after a very long period of time. The afterglow of the phosphorescence will disturb other colors, which will also reduce the scanning accuracy of paper bills. In addition, the problem of relatively low brightness of the excited secondary light also exists in the reflection scanning solution, and a secondary light image scanned according to the existing line-by-line sampling and white sample (Optical Density (OD) smaller than 0.1) compensation method has poor contrast and the scanned image is not clear, thus resulting in a failure in acquiring a paper bill anti-counterfeit image accurately to further affect identification of a genuine paper bill from a counterfeit one. FIG. 7 shows a schematic diagram of an image scanned according to the sampling sequence in FIG. 5. The ideal value of the gray scale of an anti-counterfeit image S2 in FIG. 7 should be 255. However, the actual gray scale of the anti-counterfeit image S2 is smaller than 255 due to poor contrast of the scanned secondary light image.

Currently, there is no effective solution for the problem of low scanning accuracy of paper bills in the related technologies.

SUMMARY OF THE DISCLOSURE

The major purpose of the disclosure is to provide an image scanning device and a control method thereof to solve the problem of low scanning accuracy of paper bills in the prior technologies.

To realize the purpose, an image scanning device is provided according to one aspect of the disclosure, including: a bearing member, configured to receive paper bills; a light source; a lens, wherein the incidence side of the lens and the bearing member are correspondingly arranged and the lens is configured to receive reflected light or transmission light of the paper bills under the irradiation of the light source and receive emitted light of the light source; a first converter, arranged on the emergent side of the lens and configured to convert light signals from the lens into electric signals; a controller, connected with the light source and the first converter, and configured to control the light emitting time of the light source, acquire the electric signals during the light emitting process of the light source, and acquire the electric signals again after the light source stops emitting light for a preset period of time.

Further, the light source includes: a first light source, arranged at a first side of the bearing member, and the first light source is a light source configured to generate ultraviolet light; a second light source, arranged at a second side of the bearing member, and the second side is a side opposite to the first side.

Further, the controller includes: a switch part, connected with the light source; a second converter, connected with the first converter and configured to convert the electric signals into digital signals; a processor, connected with the switch part and the second converter, wherein the processor controls the light emitting time of the light source through controlling the on/off time of the switch part.

Further, the switch part includes field effect tube; the control end of the field effect tube is connected with the processor, and the source electrode and the drain electrode of the field effect tube are arranged in a power supply loop of the light source.

Further, the image scanning device further includes: an imaging unit, connected with the controller, wherein the controller is further configured to send a gray scale value corresponding to the electric signals to the imaging unit to acquire a scanned image.

Further, the bearing member is further configured to receive a sample paper sheet; the controller is further configured to, in the case that the bearing member receives the sample paper sheet, acquire the electric signals, acquire a reference voltage and compensate the image scanning device according to the reference voltage.

Further, the OD of the sample paper sheet is larger than or equal to 0.1.

To realize the purpose above, a control method of an image scanning device is provided according to another aspect of the disclosure. The image scanning device includes a light source, a bearing member, a lens and a first converter, wherein the incidence side of the lens and the bearing member are correspondingly arranged, and the first converter is arranged on the emergent side of the lens and configured to convert light signals from the lens into electric signals; the control method includes: in the case that the bearing member receives paper bills, control the light source to emit light and acquire the electric signals during the light emitting process of the light source; control the light source to stop emitting light; acquire the electric signals again after the light source stops emitting light for a preset period of time.

Further, before controlling the light source to emit light in the case that the bearing member receives the paper bills and acquiring the electric signals during the light emitting process of the light source, the control method further includes: in the case that the bearing member receives a sample paper sheet, control the light source to emit light and acquire the electric signals during the light emitting process of the light source to acquire a reference voltage, wherein the OD of the sample paper sheet is larger than or equal to 0.1, and compensate the image scanning device according to the reference voltage.

Further, after acquiring the electric signals again after the light source stops emitting light for a preset period of time, the control method further includes: find a gray scale value corresponding to the electric signals; perform imaging according to the found gray scale value to acquire a scanned image.

The disclosure applies an image scanning device including the following structures: a bearing member, configured to receive a paper bill; a light source; a lens, wherein the incidence side of the lens and the bearing member are correspondingly arranged and the lens is configured to receive reflected light or transmission light of the paper bills under the irradiation of the light source and receive emitted light of the light source; a first converter, arranged on the emergent side of the lens and configured to convert light signals from the lens into electric signals; a controller, connected with the light source and the first converter, and configured to control the light emitting time of the light source, acquire the electric signals during the light emitting process of the light source, and acquire the electric signals again after the light source stops emitting light for a preset period of time. Through setting the controller, the controller can control the light emitting time of the light source and acquire the electric signals during the light emitting process of the light source and after the light source stops emitting light for a period of time. Such a method of discontinuous electric signal acquisition avoids disturbance caused by direct irradiation and afterglow of the light source, the problem of low accuracy of paper bill scanning in the prior technologies is solved, and the effect of increasing the accuracy of paper bill identification is achieved.

BRIEF DESCRIPTION OF THE DRAWINGS

The accompanying drawings, forming a part of the application, are used for providing further understanding of the disclosure. The exemplary embodiments of the disclosure and the illustrations thereof are used for explaining the disclosure, instead of constituting an improper limitation to the disclosure. In the accompanying drawings.

DETAILED DESCRIPTION OF THE EMBODIMENTS

It should be noted that if there is no conflict, the embodiments in the application and the characteristics in the embodiments can be combined with each other. The disclosure will be described in details below with reference to the accompanying drawings and in combination with the embodiments.

Figure 1:
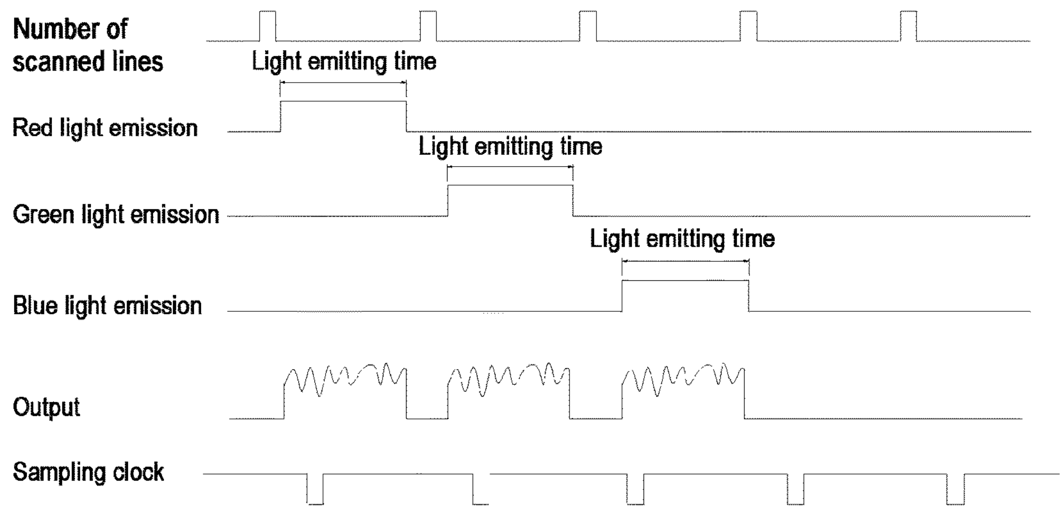
FIG. 1 is a sampling sequence diagram of an image scanning device according to the prior technologies.
Figure 2:
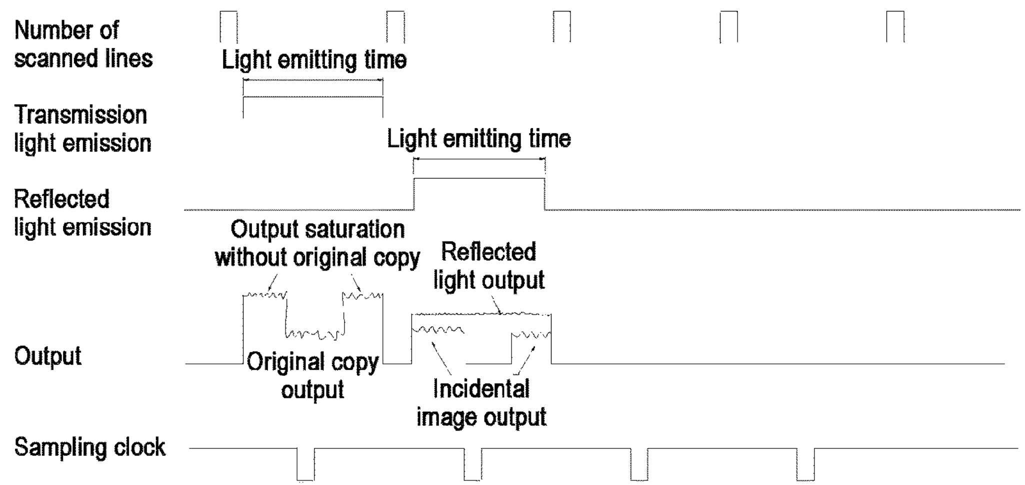
FIG. 2 is a sampling sequence diagram of a transmission scanning method in the prior technologies.
Figure 3:
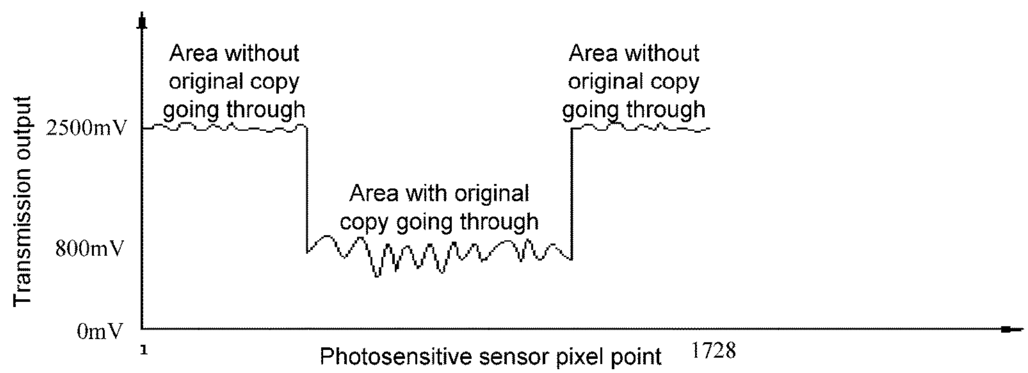
FIG. 3 is a schematic diagram of brightness acquired according to the sampling sequence in FIG. 2.
Figure 4:
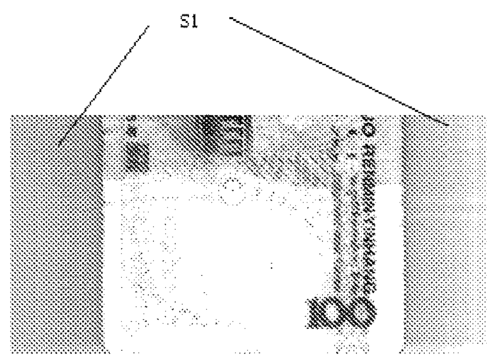
FIG. 4 is a schematic diagram of an incidental image generated by a photosensitive sensor due to output saturation.
Figure 5:
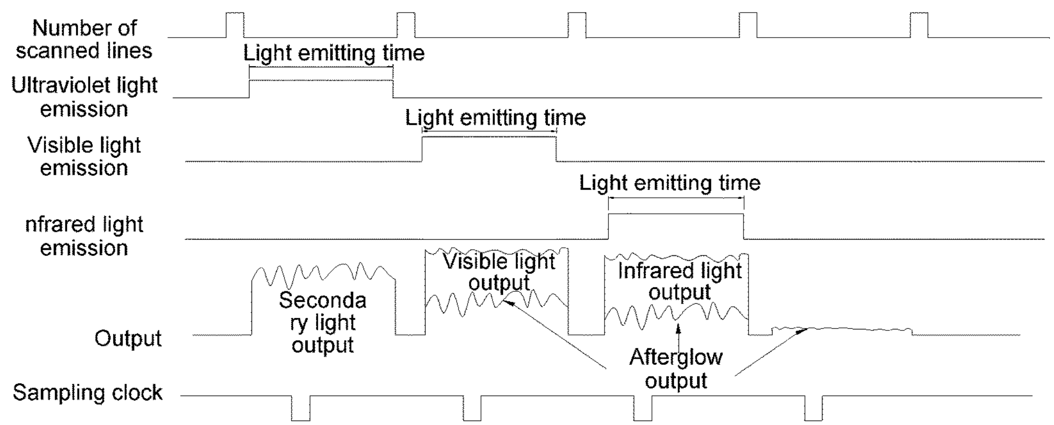
FIG. 5 is a sampling sequence diagram of a reflection scanning method in the prior technologies.
Figure 6:
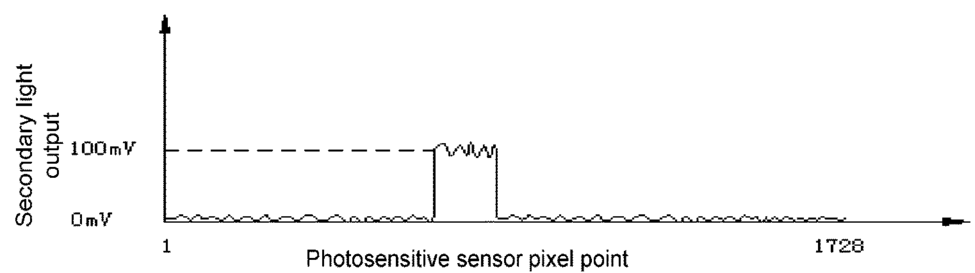
FIG. 6 is a schematic diagram of brightness acquired according to the sampling sequence in FIG. 5.
Figure 7:
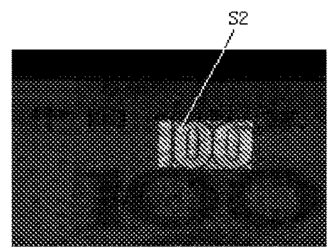
FIG. 7 shows a schematic diagram of an image scanned according to the sampling sequence in FIG. 5.
Figure 8:
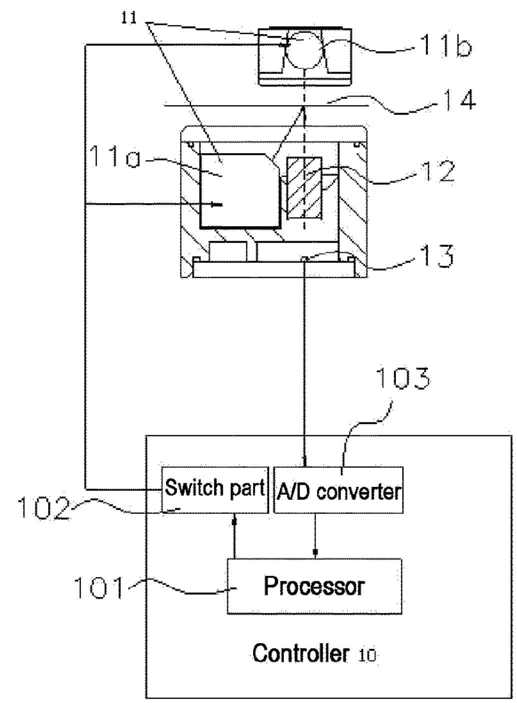
FIG. 8 is a schematic diagram of an image scanning device according to an embodiment of the disclosure.

An embodiment of the disclosure provides an image scanning device and the image scanning device provided by the embodiment of the disclosure will be specifically introduced below:

FIG. 8 is a schematic diagram of an image scanning device according to an embodiment of the disclosure. As shown in FIG. 8, the image scanning device provided by the embodiment includes: a controller 10, a light source 11, a lens 12, a first converter 13 and a bearing member 14, specifically:

The bearing member 14 is configured to receive paper bills; the light source 11 includes a first light source 11*a* and a second light source 11*b*; the first light source 11*a* is arranged at one side of the bearing member 14 and the second light source 11*b* is arranged at the other side of the bearing member 14; one is a transmission light source; the paper bills generate transmission light when irradiated by the transmission light source and the other is a reflection light source that can generate ultraviolet light, and the paper bills generate reflected light when irradiated by the reflection light source; the incidence side of the lens 12 and the bearing member 14 are correspondingly arranged; the transmission light or the reflected light generated by the paper bills can enter the lens 12, and the lens 12 can further receive light emitted by the light source 11 in an area without the paper bills going through; the first converter 13 is arranged at the emergent side of the lens 12 and configured to convert light signals from the lens 12 into electric signals; the first converter 13 may be a photosensitive sensor, or may be also other devices capable of converting light signals into electric signals; the controller 10 is connected with the light source 11 and the first converter 13 and configured to control the light emitting time of the light source 11, acquire the electric signal converted by the first converter 13 during the light emitting process of the light source 11, and acquire the electric signal converted by the first converter 13 again after the light source 11 stops emitting light for a preset period of time.

In the image scanning device of the embodiment of the disclosure, through setting the controller, the controller can control the light emitting time of the light source and acquire the electric signals during the light emitting process of the light source and after the light source stops emitting light for a period of time. Such a method of discontinuous electric signal acquisition avoids disturbance caused by direct irradiation and afterglow of the light source, the problem of low accuracy of paper bill scanning in the prior technologies is solved, and the effect of increasing the accuracy of paper bill identification is achieved.

Figure 9:
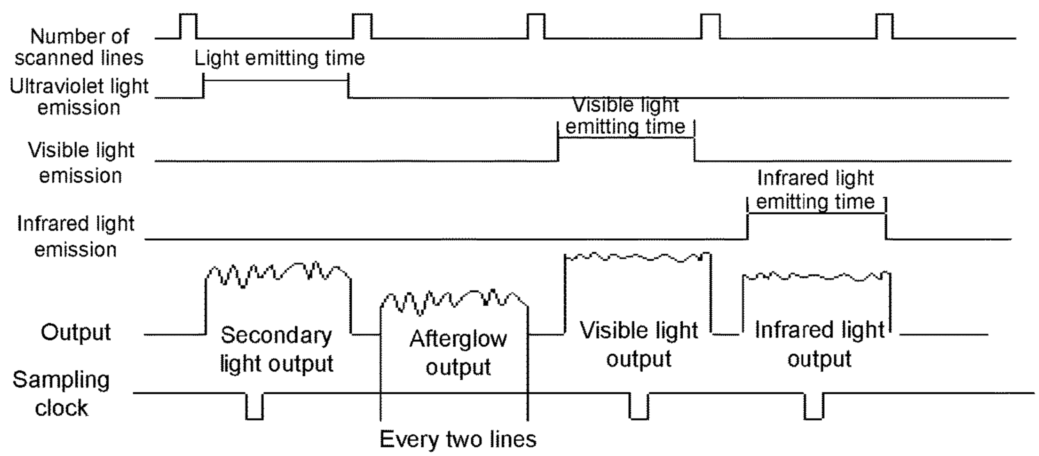
FIG. 9 is a diagram of a first sequence of interleaved sampling during reflection scanning of an image scanning device according to an embodiment of the disclosure.

The so-called acquisition again of the electric signals converted by the first converter 13 after the light source 11 stops emitting light for a preset period of time refers to that: relative to line-by-line scanning in the prior technologies, the image scanning device provided by the embodiment of the disclosure applies an interweaved scanning method. FIG. 9 is a diagram of a first sequence of interleaved sampling during reflection scanning of an image scanning device according to an embodiment of the disclosure. Light of a light source 11*b* irradiated on a paper bill received by a bearing member 14 and is reflected by the paper bills to be focused on a photosensitive sensor by a lens 12. The light source includes ultraviolet light; the ultraviolet light excites secondary light (phosphorescence) of the paper bills; then after the secondary light is sampled, lights of other colors are sampled every two lines, thus effectively avoiding disturbance of the phosphorescence afterglow on lights of other colors and improving the image scanning accuracy.

Figure 10:
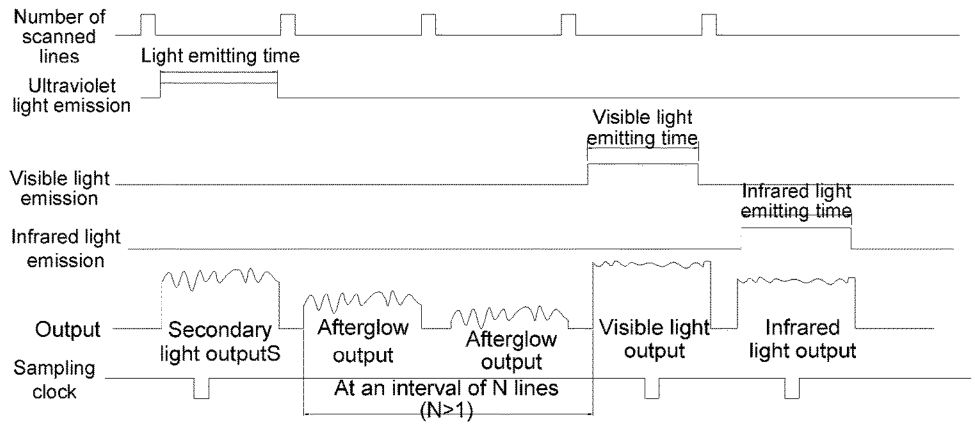
FIG. 10 is a diagram of a second sequence of interleaved sampling during reflection scanning of an image scanning device according to an embodiment of the disclosure.

In the embodiment of the disclosure, after sampling the secondary light, the controller 10 may further sample lights of other colors at an interval of N (N>1) lines according to the difference of afterglow light emitting time. As shown in FIG. 10, disturbance of the phosphorescence afterglow on lights of other colors is also avoided.

Figure 11:
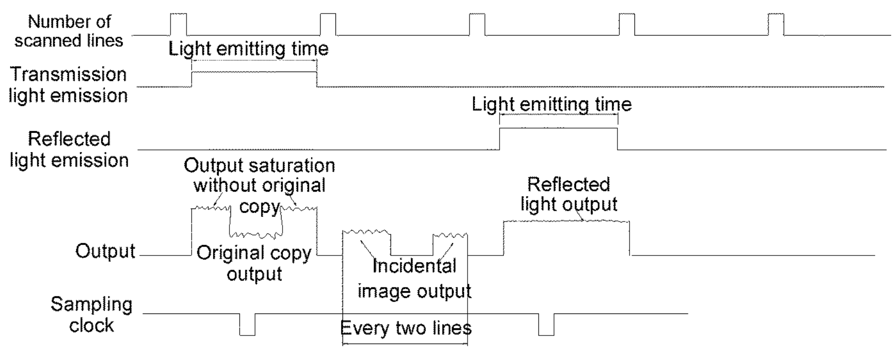
FIG. 11 is a diagram of a first sequence of interleaved sampling during transmission scanning of an image scanning device according to an embodiment of the disclosure.

FIG. 11 is a diagram of a first sequence of interleaved sampling during transmission scanning of an image scanning device according to an embodiment of the disclosure. As shown in FIG. 11, light emitted by a light source 11*a* penetrates through a paper bill received by a bearing member 14, which passes through a lens 12 and is focused on a photosensitive sensor. In an area without the paper bills going through, since transmission light enters the lens directly, the output of the photosensitive sensor in the area is saturated to generate an incidental image. Lights of other colors are sampled every two lines after sampling the output of the transmission light, thus effectively avoiding disturbance of the incidental image on lights of other colors and improving the image scanning accuracy.

Figure 12:
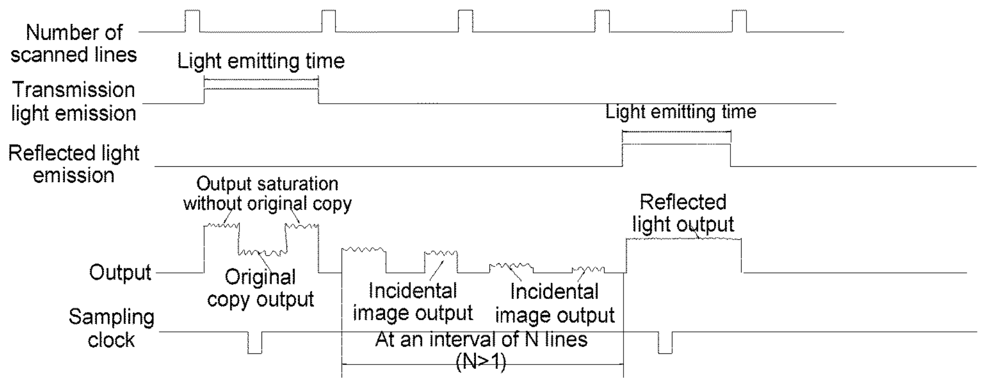
FIG. 12 is a diagram of a second sequence of interleaved sampling during transmission scanning of an image scanning device according to an embodiment of the disclosure.

In the embodiment of the disclosure, according to the difference of transmission light intensity and the difference of incidental image output of the photosensitive sensor, lights of other colors are sampled at an interval of N (N>1) after sampling transmission output. As shown in FIG. 12, disturbance of the incidental image on lights of other colors may be also avoided.

Further, the image scanning device further includes an imaging unit (not shown in the figures). The imaging unit is connected with the controller 10. The controller 10 is further configured to send a gray scale value corresponding to the electric signals to the imaging unit to acquire a scanned image. Specifically, the controller 10 includes a processor 101, a switch part 102 and a second converter 103, wherein the imaging unit is connected with the processor 101, the switch part 102 is connected with the light source 11 and the processor 101 is connected with the switch part 102. The light emitting time of the light source 11 is controlled through controlling the on/off time of the switch part 102. Specifically, the switch part 102 may be a field effect tube. The control end (i.e. the grid electrode of the field effect tube) of the field effect tube is connected with the processor 101. The source electrode and the drain electrode of the field effect tube are arranged in a power supply loop of the light source 11. The processor 101 controls the light emitting time of the light source 11 through controlling the field effect tube. The second converter 103 is connected with the first converter 13 and the processor 101 and is configured to convert the electric signals into digital signals and transmit the digital signals to the processor 101. The processor 101 sends a gray scale value corresponding to the received digital signals to the imaging unit to perform imaging and acquire a scanned image. Specifically, the second converter 103 may be an A/D converter (i.e. Analog to Digital converter), or may be also other devices capable of converting analog signals into digital signals.

Preferably, the bearing member 14 in the image scanning device provided by the embodiment of the disclosure is further configured to receive a sample paper sheet, wherein the OD value of the sample paper sheet is larger than or equal to 0.1. The controller 10 is further configured to, in the case that the bearing member 14 receives the sample paper sheet, acquire the electric signals, acquire a reference voltage and compensate the image scanning device according to the reference voltage.

Figure 13:
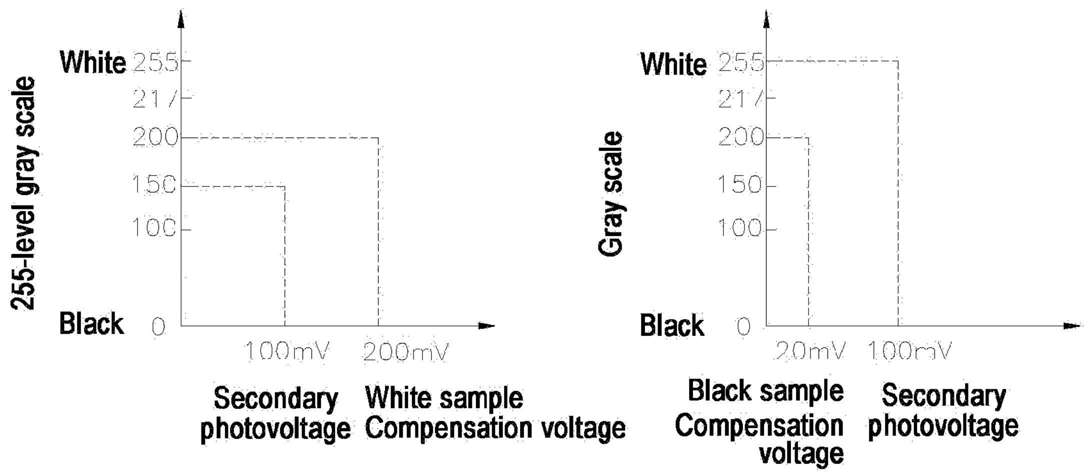
FIG. 13*a* is an explanatory drawing of compensating ultraviolet light with a white sample by an image scanning device in the prior technologies.
FIG. 13*b* is an explanatory drawing of compensating ultraviolet light with a gray scale sample by an image scanning device in an embodiment of the disclosure.
Figure 14:
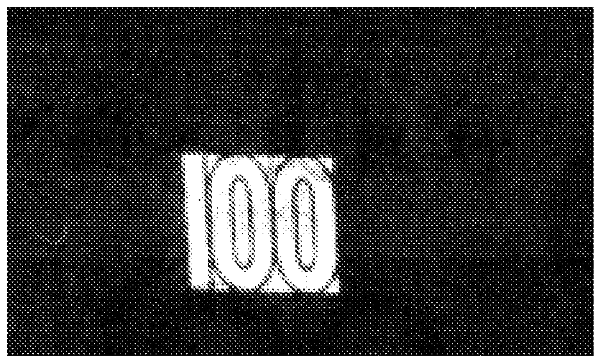
FIG. 14 shows a schematic diagram of an image scanned according to a compensation method in FIG. 13*b*.

FIG. 13*a* is an explanatory drawing of compensating ultraviolet light with a white sample by an image scanning device in the prior technologies. FIG. 13*b* is an explanatory drawing of compensating ultraviolet light with a gray scale sample (OD value larger than 0.1) by an image scanning device of an embodiment of the disclosure. FIG. 14 shows a schematic diagram of an image scanned according to a compensation method in FIG. 13*b*. As shown in FIG. 13*a*, FIG. 13*b* and FIG. 14, an image scanning device needs to be compensated during image scanning to define a gray scale value of a scanned image accurately, but a secondary light image scanned by using a white sample (OD value smaller than 0.1) in the prior technologies has poor contrast and the scanned image is not clear. In the solution that the image scanning device provided by the embodiment of the disclosure scans according to reflection, according to the characteristics of relatively weak emitted ultraviolet light, and relatively low brightness and relatively low output of excited secondary light, a gray sample having an OD value larger than or equal to 0.1 are compensated for the ultraviolet light, so that a compensation voltage is lower, and smaller than the output voltage value of the secondary light. Through compensation by using a gray sample, a relatively low compensation voltage is acquired, i.e. a relatively low system reference voltage is acquired. During image scanning, an image corresponding to a voltage lower than the reference voltage will be considered to be black, and an image corresponding to a voltage higher than the reference voltage will be considered to be white, thus acquiring a scanned image with relatively high image contrast of shade to further improve the scanning accuracy of the image scanning device.

Figure 15:
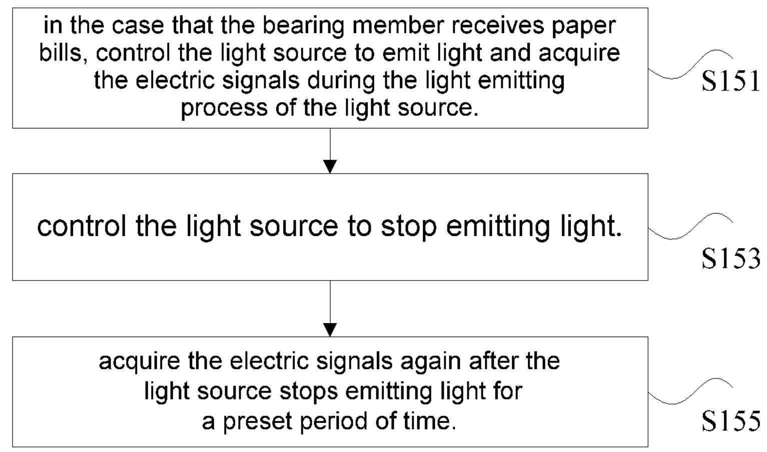
FIG. 15 is a flowchart of a control method of an image scanning device according to an embodiment of the disclosure.

An embodiment of the disclosure further provides a control method of an image scanning device. The control method of the image scanning device of the embodiment may be implemented by an image scanning device provided by the above content of the embodiment of the disclosure, i.e. the image scanning device includes a light source, a bearing member, a lens and a first converter, wherein the incidence side of the lens and the bearing member are correspondingly arranged, and the first converter is arranged on the emergent side of the lens and configured to convert light signals from the lens into electric signals. The control method of the image scanning device provided by the embodiment of the disclosure will be specifically introduced below:

FIG. 15 is a flowchart of a control method of an image scanning device according to an embodiment of the disclosure. As shown in FIG. 15, the control method of the image scanning device provided by the embodiment includes Step 151 to Step 155 as follows:

Step 151: in the case that the bearing member receives paper bills, control the light source to emit light and acquire the electric signals during the light emitting process of the light source.

Step 153: control the light source to stop emitting light, specifically, the light source is controlled to stop emitting light mainly by controlling a power supply loop of the light source to turn off.

Step 155: acquire the electric signals again after the light source stops emitting light for a preset period of time.

According to the control method of the image scanning device of the embodiment of the disclosure, through acquiring the electric signals during the light emitting process of the light source and after the light source stops emitting light for a period of time, such a method of discontinuous electric signal acquisition avoids disturbance caused by direct irradiation and afterglow of the light source, the problem of low accuracy of paper bill scanning in the prior technologies is solved, and the effect of increasing the accuracy of paper bill identification is achieved, wherein after acquiring the electric signals, the control method of the image scanning device of the embodiment of the disclosure further includes: find a gray value corresponding to the electric signals; perform imaging according to the found gray value to acquire a scanned image.

Preferably, before controlling the light source to emit light in the case that the bearing member receives the paper bills and acquiring the electric signals during the light emitting process of the light source, the control method of the image scanning device of the embodiment of the disclosure further includes: in the case that the bearing member receives a sample paper sheet, control the light source to emit light and acquire the electric signals during the light emitting process of the light source to acquire a reference voltage, wherein the OD of the sample paper sheet is larger than or equal to 0.1, and compensate the image scanning device according to the reference voltage.

Because of the characteristics of relatively weak emitted ultraviolet light, and relatively low brightness and relatively low output of excited secondary light in the reflection scanning solution, a gray sample having an OD value larger than or equal to 0.1 are compensated for the ultraviolet light, so that a compensation voltage is lower, and smaller than the output voltage value of the secondary light. Through compensation by using a gray sample, a relatively low compensation voltage is acquired, i.e. a relatively low system reference voltage is acquired. During image scanning, an image corresponding to a voltage lower than the reference voltage will be considered to be black, and an image corresponding to a voltage higher than the reference voltage will be considered to be white, thus acquiring a scanned image with relatively high image contrast of shade to further improve the scanning accuracy of the image scanning device.

It can be learned from the description above that the disclosure realizes the effect of increasing paper bill identification accuracy.

It should be noted that, the steps as illustrated in the flowchart of the accompanying drawings may be implemented by a computer system of a group of computer executable commands for example. In addition, although logical sequences have been illustrated in the flowchart, the steps as shown or as described may be implemented according to sequences different from those as described herein in some cases.

Obviously, those skilled in the technologies should understand that the modules or steps of the disclosure described above may be implemented by general computing devices and centralized in a single computing device or distributed in a network consisting of multiple computing devices. Optionally, the modules or steps may be implemented by program codes executable by the computing devices, so that they may be stored in a storage device and executed by the computing devices, or respectively made them into integrated circuit modules, or multiple modules or steps in the modules or steps may be made into a single integrated circuit module. By doing so, the disclosure is not limited to any specific combination of hardware and software.

The description above are only preferred embodiments of the invention and should not be used to limit the invention. For those skilled in the technologies, the disclosure may have various modifications and changes. Any modifications, equivalent replacements, improvements and the like within the spirit and principle of the disclosure shall fall within the scope of protection of the invention.

What is claimed is:

1. An image scanning device, comprising:

a bearing member (14), configured to receive paper bills;

a light source (11);

a lens (12), wherein incidence side of the lens and the bearing member (14) are correspondingly arranged and the lens is configured to receive reflected light or transmission light of the paper bills under the irradiation of the light source (11) and receive emitted light of the light source (11);

a first converter (13), arranged on emergent side of the lens (12) and configured to convert light signals from the lens (12) into electric signals; and a controller (10), connected with the light source (11) and the first converter (13), and configured to control the light emitting time of the light source (11), acquire electric signals during the light emitting process of the light source (11), and acquire the electric signals again after the light source (11) stops emitting light for a preset period of time;

wherein the image scanning device further comprises: an imaging unit, connected with the controller (10), wherein the controller (10) is further configured to send a gray scale value corresponding to the electric signals to the imaging unit to acquire a scanned image;

wherein the bearing member (14) is further configured to receive a sample paper sheet the controller (10) is further configured to, in the case that the bearing member (14) receives the sample paper sheet, acquire the electric signals, acquire a reference voltage and compensate the image scanning device according to the reference voltage.

2. The image scanning device according to claim 1, wherein the light source (11) comprises:

a first light source (11*a*), arranged at a first side of the bearing member (14), and the first light source (11*a*) is a light source configured to generate ultraviolet light; and a second light source (11*b*), arranged at a second side of the bearing member (14), and the second side is a side opposite to the first side.

3. The image scanning device according to claim 1, wherein the controller (10) comprises:

a switch part (102), connected with the light source (11);

a second converter (103), connected with the first converter (13) and configured to convert the electric signals into digital signals; and a processor (101), connected with the switch part (102) and the second converter (103), wherein the processor (101) controls light emitting time of the light source (11) through controlling the on/off time of the switch part (10).

4. The image scanning device according to claim 3, wherein the switch part (102) comprises field effect tube; control end of the field effect tube is connected with the processor (101), and source electrode and drain electrode of the field effect tube are arranged in a power supply loop of the light source (11).

5. The image scanning device according to claim 1, wherein Optical Density (OD) of the sample paper sheet is larger than or equal to 0.1.

6. A control method of an image scanning device, wherein the image scanning device comprises a light source, a bearing member, a lens and a first converter, wherein incidence side of the lens and the bearing member are correspondingly arranged, and the first converter is arranged on emergent side of the lens and configured to convert light signals from the lens into electric signals; the control method comprises:

in the case that the bearing member receives paper bills, controlling the light source to emit light and acquiring the electric signals during the light emitting process of the light source;

controlling the light source to stop emitting light; and acquiring the electric signals again after the light source stops emitting light for a preset period of time;

wherein after acquiring the electric signals again after the light source stops emitting light for a preset period of time, the control method further comprises: finding a gray scale value corresponding to the electric signals; and performing imaging according to the found gray scale value to acquire a scanned image.

7. The control method according to claim 6, wherein before controlling the light source to emit light in the case that the bearing member receives the paper bills and acquiring the electric signals during the light emitting process of the light source, the control method further comprises:

in the case that the bearing member receives a sample paper sheet, controlling the light source to emit light and acquiring the electric signals during the light emitting process of the light source to acquire a reference voltage, wherein the OD of the sample paper sheet is larger than or equal to 0.1, and compensating the image scanning device according to the reference voltage.

* * * * *